United States Patent [19]

Goodrich et al.

[11] 4,058,292
[45] Nov. 15, 1977

[54] VEHICLE LEVELING SYSTEM

[76] Inventors: Harold E. Goodrich, 2817 Bridgeport Ave.; Dolores M. Fabel, 185 Franciscan Drive, both of San Ramon, Calif. 94583

[21] Appl. No.: 802,605

[22] Filed: June 2, 1977

[51] Int. Cl.² ............................................. E02C 3/00
[52] U.S. Cl. .................................................... 254/88
[58] Field of Search ................... 254/88; 280/762–763

[56] References Cited

U.S. PATENT DOCUMENTS

| | | | |
|---|---|---|---|
| 1,356,697 | 10/1920 | Crane | 254/88 |
| 2,184,061 | 12/1939 | Skroback | 254/88 |
| 2,420,130 | 5/1947 | Foss | 254/88 |

*Primary Examiner*—Robert C. Watson
*Attorney, Agent, or Firm*—Townsend and Townsend

[57] ABSTRACT

A system for leveling a vehicle parked on uneven terrain is disclosed. The wheel of the vehicle on the lowest position on the terrain is determined together with the relative amount that the low wheel must be raised to level the vehicle. An inclined ramp is adapted to be disposed proximate the low wheel of the vehicle, and the ramp is nonrigidly linked to the vehicle at a position on the vehicle disposed relatively behind the base of the ramp. The linking means includes coded indicia to indicate the appropriate length of the linking means required to allow the vehicle to travel up the ramp until the vehicle is substantially level. The vehicle is then motivated to cause the low wheel to travel up the ramp until the linking means becomes taut, to stop the vehicle in the level position.

11 Claims, 10 Drawing Figures

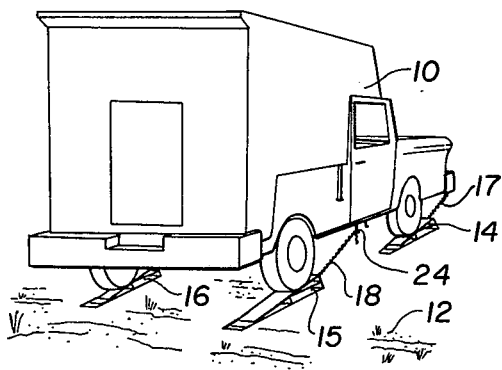
FIG.___1.
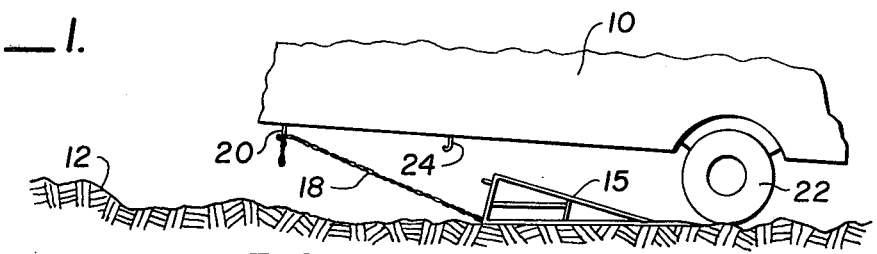
FIG.___2A.
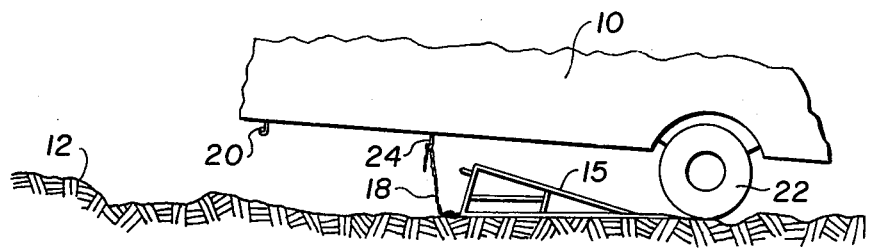
FIG.___2B.
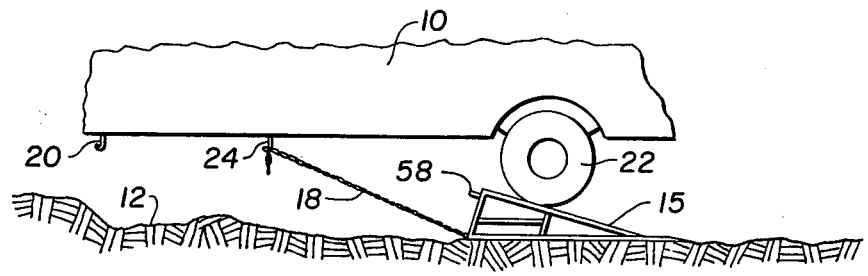
FIG.___2C.

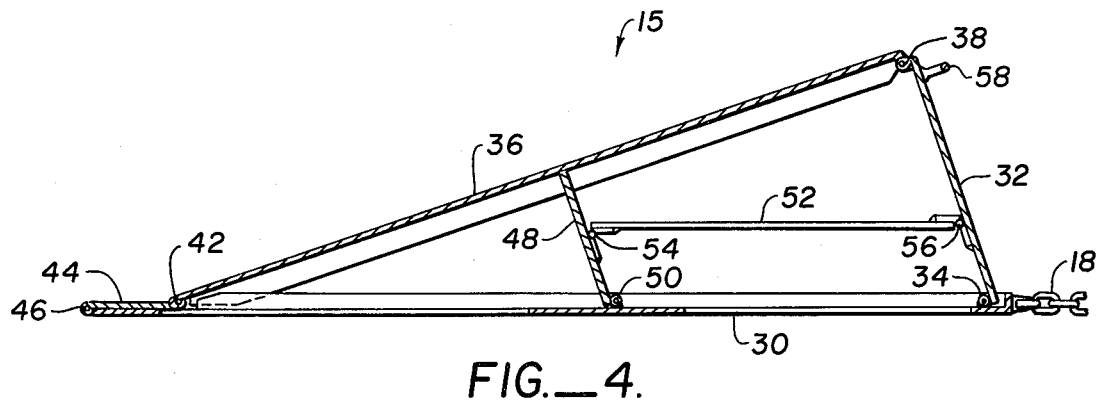
FIG._4.
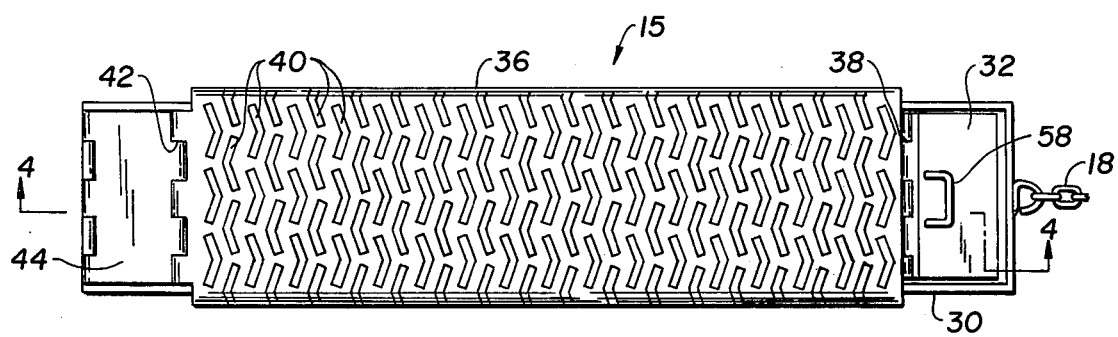
FIG._3.
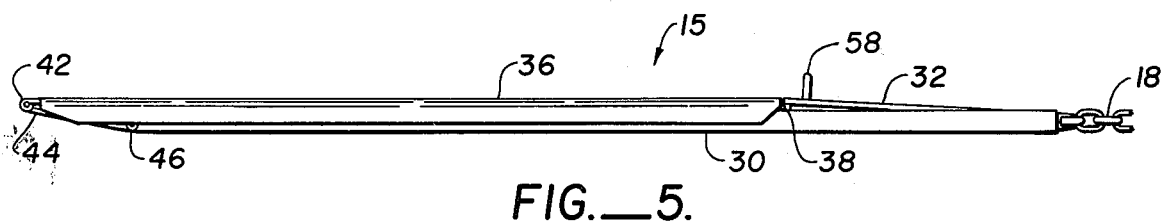
FIG._5.

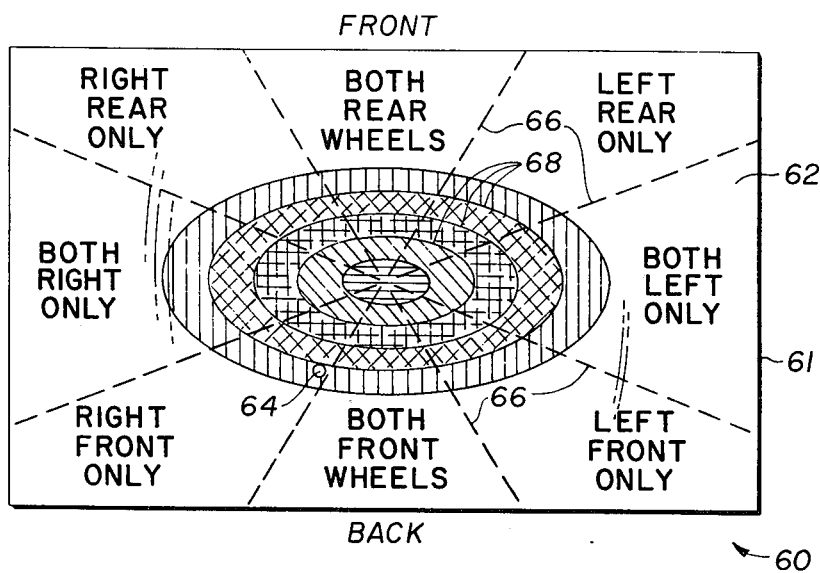
FIG._6.
FIG._7.
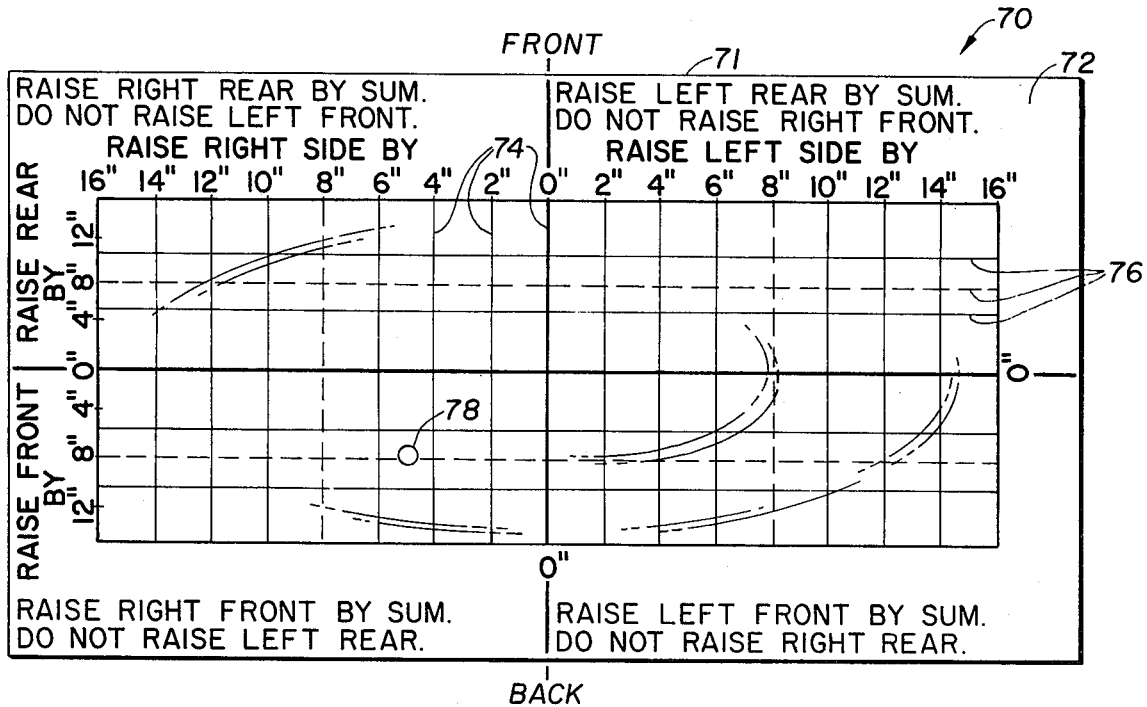
FIG._8.

VEHICLE LEVELING SYSTEM

BACKGROUND OF THE INVENTION

The present invention provides a system for leveling a vehicle such as a recreational vehicle parked on uneven terrain.

In the past several years the use of recreational vehicles such as campers, vans, motor homes and the like has greatly expanded, in large measure taking the place of traditional camping equipment. Such vehicles are often parked in off-road locations such as established campsites or turnouts on the side of the road, and in fact their ability to function as living accommodations in such locations is one of their primary attractions. However, a common annoyance in such situations is that the vehicle is often not parked on level terrain and the vehicle as a whole is not level. This problem becomes more than merely an annoyance in vehicles containing many types of appliances such as refrigerators because such appliances may not work unless the vehicles are almost perfectly level.

Various systems have been proposed for use in leveling recreational vehicles and other types of vehicles on irregular terrain. The patent to McKeen, U.S. Pat. No. 3,990,681, illustrates a pneumatic ramp in which the air pressure can be adjusted to level the vehicle. The patent to Phillips, U.S. Pat. No. 3,632,087, illustrates a mechanism in which the distance between two ridges can be adjusted to level the vehicle. The patent to Wechter, U.S. Pat. No. 3,630,487, illustrates a ramp upon which a stop is located to prevent the vehicle from rolling back down the ramp. The patent to Tarr, U.S. Pat. No. 3,295,829, illustrates a ramp attachable to a frame at different locations for leveling purposes. All of these systems require the vehicle to be leveled by trial and error. No direct calibration mechanism is provided to insure that the vehicle is properly leveled.

SUMMARY OF THE INVENTION

The present invention provides a system for leveling a vehicle parked on uneven terrain. The wheel of the vehicle on the lowest position on the terrain is determined together with the relative amount that the low wheel must be raised to level the vehicle. An inclined ramp is adapted to be disposed proximate the low wheel of the vehicle, and the ramp is non-rigidly linked to the vehicle at a position on the vehicle disposed relatively behind the base of the ramp. The linking means includes coded indicia to indicate the appropriate length of the linking means required to allow the vehicle to travel up the ramp until the vehicle is substantially level. The vehicle is then motivated to cause the low wheel to travel up the ramp until the linking means becomes taut, to stop the vehicle in the level position.

The present invention provides a fast, simple, reliable and accurate mechanism for first determining which wheel on the vehicle should be raised and the amount that the low wheel should be raised to level the vehicle. The system of the present invention further includes a linking mechanism between the vehicle and the ramp which is adjustable relative to the amount that the low wheel of the vehicle should be raised so that the low wheel is raised the precise amount required without resort to trial and error. Thus, the present invention is far more convenient and potentially more accurate than existing systems.

In preferred embodiments of the present invention, more than one wheel on the vehicle may be raised simultaneously to more accurately level the vehicle. Various forms of inclinometers which indicate the amount that the various wheels should be raised to level the vehicle are disclosed herein. In addition, a mechanism by which multiple ramps can be arranged on the terrain in the proper location by means of secondary hooks on the vehicle is also disclosed. All of these features of the present invention render it far more accurate than prior systems, while maintaining its ease of operation.

None of the patents discussed above disclose the advantageous features of the present invention, other than the fact that a ramp can be used. The most relevant patents found in the prior art appear to be mechanisms for jacking a vehicle. The patent to Foss, U.S. Pat. No. 2,420,130, illustrates an erectable ramp having some similarity to the ramp of the present invention. The patent to Crane, U.S. Pat. No. 1,356,697, illustrates a chain which prevents further travel of a vehicle after it is located on a jack. However, these patents only suggest certain aspects of various elements of the present invention, and not the invention as a whole.

The novel features which are characteristic of the invention, as to organization and method of operation, together with further objects and advantages thereof will be better understood from the following description considered in connection with the accompanied drawings which preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a perspective view of a recreational vehicle using the leveling system of the present invention.

FIGS. 2A, B and C are fragmentary side elevational views illustrating the raising of one wheel of a recreational vehicle on the ramp of the system of the present invention.

FIG. 3 is a top view of the preferred embodiment of the ramp of the present invention.

FIG. 4 is a side cross sectional view of the preferred embodiment of the ramp of the present invention taken along lines 4—4 of FIG. 3.

FIG. 5 is a side elevation view of the ramp of FIGS. 3 and 4 in the collapsed position for storage.

FIG. 6 is a top plan view of a preferred embodiment of the inclinometer of the present invention used with a two ramp system.

FIG. 7 is a side elevation view of the inclinometer of FIG. 6.

FIG. 8 is a top plan view of a preferred embodiment of the inclinometer of the present invention used in a three ramp system.

DESCRIPTION OF THE PREFERRED EMBODIMENTS

Referring initially to FIG. 1, a recreational vehicle 10 parked on irregular terrain 12 is illustrated. Three ramps 14, 15 and 16 are provided by the present invention for raising three wheels of recreational vehicle 10 to the level of a fourth (left front) wheel so that the vehicle is almost perfectly level. Each ramp 14–16 is connected to vehicle 10 by a chain such as 17, 18 emanating from the base of the ramp and is stretched taut as will be illustrated hereinafter.

The manner in which a ramp such as 15 is positioned for raising the vehicle is illustrated by way of reference to FIGS. 2A, B and C in combination. When several ramps are used each ramp is positioned in the same manner. Referring initially to FIG. 2A, the chain 18 emanating from the base of ramp 15 is attached to a first hook 20 on the underside of vehicle 10. As will be described in more detail hereinafter, the length of chain 18 between the base of ramp 15 and hook 20 is preselected to control the distance that the wheel 22 on recreational vehicle 10 will eventually move up ramp 15. Chain 18 has color coded sections or other indicia to indicate the relative length of the chain from the ramp. Initially, the appropriate length of chain 18 is preselected and the chain is extended until it is taut and ramp 15 placed on the terrain 12 accordingly adjacent wheel 22.

Referring next to FIG. 2B, after ramp 15 has been positioned on the terrain 12, chain 18 is disconnected from hook 20 and the same link of the chain is reattached on a hook 24 closer to wheel 22. Chain 18 is thus slack as illustrated in FIG. 2B until the vehicle is moved.

After chain 18 is reconnected on hook 24, and the ramps corresponding to other wheels have been positioned in the same manner, vehicle 10 is motivated under its own power so that the wheel 22 of vehicle 10 moves up ramp 15. When chain 18 becomes taut, as illustrated in FIG. 2C, further movement of vehicle 10 is prevented, and the vehicle is stopped in its level position if the length of chain 18 has been properly selected, as discussed hereinafter.

If only one ramp is used to level vehicle 10, prepositioning of ramp 15 as illustrated in FIG. 2A is unnecessary. However, it is usually preferred that two or three ramps be used to level the two or three lower wheels of the recreational vehicles simultaneously. By prepositioning each of the ramps as illustrated in FIG. 2A, the relative position of each ramp with respect to its corresponding wheel is determined. Thus, when recreational vehicle 10 is moved to its final position, each chain such as 18 will become taut at the same moment in time, and each wheel which is to be raised will be at the position necessary to render the vehicle completely level. If the prepositioning of the ramps described in FIG. 2A were not performed, the position of the ramps would most likely be such that the chains do not become taut at the same moment in time and the vehicle would not be leveled in an accurate fashion.

The preferred embodiment of a ramp such as 15 of the present invention is illustrated by way of reference to FIGS. 3, 4 and 5 in combination. Ramp 15 includes a floor plate 30 adapted to rest upon the surrounding terrain. A base plate 32 is attached to floor plate 30 by hinge 34. Base plate 32 is in turn attached to an erectile member 36 by hinge 38. Erectile member 36 has a rippled upper surface 40 to provide traction for a wheel being moved up the ramp. Erectile member 36 is in turn hingeably attached at 42 to a swing member 44 which is connected by a hinge 46 to floor plate 30 to complete a closed loop.

A support member 48 is attached to floor plate 30 by hinge 50, and is pivotably attached to an erection member 52 by hinge 54. Erection member 52 is in turn attached to base plate 32 by hinge 56.

When not in use, ramp 15 can be stored in a flat configuration as illustrated in FIG. 5. Swing member 44 is pivoted about hinge member 46 so that it extends forwardly. As the result, base plate 32 folds downwardly together with support member 48 and the device collapses as illustrated in FIG. 5.

When ramp 15 is to be used, handle 58 is pulled to pivot swing member 44 about hinge 46 to erect the ramp. During the erection process, erection member 52 is drawn backwardly to raise support member 48 until it contacts the underside of member 36 to provide support in the middle portion of the ramp so that it does not collapse when a vehicle is located thereon. More than one such support member may be used if necessary. Chain 18 emanates from the base of ramp 15 for purposes described hereinabove.

An inclinometer 60 used to determine which two of the vehicles four wheels should be raised in a two ramp system, and the amount that each such wheel should be raised, is illustrated by way of reference to FIGS. 6 and 7. Inclinometer 60 includes a liquid filled container 61 having an upper convex surface 62. Convex surface 62 is transparent, and a small air bubble 64 formed in container 60 is clearly visible. Air bubble 64 will always appear at the highest true vertical position of convex surface 62 as in a carpenter's level.

Convex surface 62 is divided into pie shaped segments by dash lines 66 which indicate which of the two wheels or which two wheels should be raised to most accurately level the vehicle. A plurality of oval indicia 68 indicate the relative amount which one or two of the lower wheels should be raised to level the vehicle. The areas encompassed by oval indicia 68 are indicated by various colors as illustrated. The designations "front" and "back" illustrate the orientation of inclinometer 60 with respect to the recreational vehicle.

If air bubble 64 moves directly to the left of the center of convex surface 62 of inclinometer 60, it is apparent that the left side of the recreational vehicle is higher than the right side, and that both right wheels should be raised to level the vehicle. The further that air bubble 64 moves to the left, the more that the right wheels must be raised so that the vehicle is level. Accordingly, referring to FIG. 6, inclinometer 60 indicates that both right wheels are to be raised, and the color coding indicates the amount which the right wheels should be raised.

If air bubble 64 moves to the lower left as illustrated in FIG. 7, it is apparent that the right front wheel of the recreational vehicle is low and should be raised to level the vehicle. The left front and right rear should also be raised somewhat but in a two ramp system as illustrated in FIGS. 6 and 7, such refinements are ignored and only the right front wheel is raised to maintain the vehicle in an approximately level configuration.

In the inclinometer 60 illustrated in FIGS. 6 and 7, convex surface 62 has a spherical configuration. Accordingly, the location of bubble 64 will reflect the relative angular movement of the recreational vehicle necessary to level the vehicle. However, since the distance from the front to the back wheels (wheel base) is much greater than the distance of the wheels from side to side (track), the actual vertical travel required by the front or rear wheels to achieve a desired angular movement will be much more than that required by the side wheels. Accordingly, indicia 68 have an oval configuration to allow for the difference in corrective angle accomplished by the respective vertical travel of the different wheels. Convex surface 62 could be modified so that it is not spherical to account for the difference between wheel base and track, in which case indicia 68 could be circular.

A second embodiment 70 of an inclinometer useful in a three ramp system is illustrated by way of reference to FIG. 8. Inclinometer 70 again includes a liquid filled container 71 having a convex upper surface 72, and in this respect is similar in elevation to inclinometer 60 as illustrated in FIG. 7.

Convex surface 72 has a grid defined by vertical indicia 74 and horizontal indicia 76. Such indicia contain a numerical index of inches by which the amount that the various wheels must be raised to level the vehicle can be computed. An air bubble 78 in the liquid filled container 71 is visible to indicate which wheels are to be raised and the amount by which each wheel is to be raised.

When air bubble 78 is to the lower left as illustrated in FIG. 8, it indicates that the left rear wheel is the high wheel of the vehicle and is the only wheel which is not to be raised to level the vehicle. The right front wheel is the lowest wheel. Reading across to the left from air bubble 78, an indication of "RAISE FRONT BY 8 INCHES" is obtained. Reading upwardly, a reading of "RAISE SIDE BY 5 INCHES" is obtained.

Grid 74, 76 is divided into quadrants, and in FIG. 8 air bubble 78 is in the lower left hand quadrant. As indicated in that quadrant, the left rear wheel is not raised, being the highest wheel. The right front wheel is to be raised by the sum of the indicated values, i.e., 8 inches plus 5 inches equals 13 inches. Also, the left front is to be raised by 8 inches, and the right rear by 5 inches. The chains such as 18 attached to the three ramps can be positioned to reflect the proper amount by which the wheels are to be raised using color coded sections on the chains corresponding to the indicia by which the respective wheels are raised by the ramps, and the vehicle moved on to the ramps to level the vehicle.

While a three ramp system is preferred because it more accurately levels the vehicle, it is apparent from the above that computing the amount that each of the three wheels should be raised is relatively complex. Accordingly, a two wheel system as described with reference to FIGS. 6 and 7 may be preferable as a practical matter. One ramp systems may also be used and may be sufficiently accurate in certain situations. An inclinometer for a one ramp system is not disclosed because it is anticipated that the development of such an inclinometer would be obvious in view of those shown for the two and three ramp systems.

In operation, after vehicle 10 is parked at a campsite or other offroad location, the inclinometer (60 or 70) is examined to determine which wheels of the vehicle should be raised and the amount of the various wheels should be raised depending on the number of ramps to be used. The appropriate lengths of the chains attached to the ramps is selected using the color codes on the chains, and each of the ramps is positioned on the ground using the secondary hooks on the underside of the vehicle. The chains are then transferred to the primary hooks and the vehicle is moved so that the wheels run up the ramps until the vehicle is level, at which time the chains become taut and further movement of the vehicle is prevented.

While preferred embodiments of the present invention have been illustrated hereinabove, it is apparent that modifications and adaptations of those embodiments will occur to those skilled in the art. However, it is to be expressly understood that such modifications and adaptations are within the spirit and scope of the present invention, as thus set forth in the following claims.

I claim:

1. A system for leveling a vehicle parked on uneven terrain comprising:
    means for determining the wheel of the vehicle on the lowest position on the terrain, said determining means including means for indicating the relative amount that said low wheel should be raised to level the vehicle;
    an inclined ramp adapted to be disposed proximate the low wheel of the vehicle; and
    means for nonrigidly linking the ramp to the vehicle at a position on the vehicle disposed relatively behind the base of said ramp when the ramp is located proximate the low wheel of the vehicle so that the vehicle can be motivated to cause the low wheel to travel up the ramp until the linking means becomes taut, said linking means including coded indicia corresponding to the determining means to indicate the appropriate length of said linking means required to allow the vehicle to travel up the ramp until the vehicle is substantially level, the linking means then becoming taut to stop the vehicle in the level position.

2. A system as recited in claim 1 wherein the ramp comprises four rigid members hinged together at their ends to form an enclosed loop, said rigid members being foldable from a flat configuration for storage into a ramp configuration for use to level the vehicle.

3. A system as recited in claim 1 and additionally comprising a hook located on the vehicle at said position on the vehicle disposed relatively behind the base of said ramp for attachment on the linking means thereto.

4. A system as recited in claim 1 wherein the linking means comprises a chain.

5. A system as recited in claim 1 wherein the determining means includes coded indicia and the indicia of the linking means are coded in corresponding colors.

6. A system as recited in claim 1 wherein the determining means comprises a liquid filled container having a convex, transparent upper surface, said container containing an air bubble which moves along the underside of the convex surface to indicate the highest point of said surface, said coded indicia being located on said convex surface to indicate the low wheel and the relative amount that said low wheel should be raised to level the vehicle.

7. A system for leveling a vehicle parked on uneven terrain comprising:
    means for determining the wheel or wheels of the vehicle on lower positions on the terrain relative to one or more other wheels on the vehicle, said determining means including coded indicia indicating the relative amount that said lower wheel or wheels should be raised to level the vehicle;
    one or more inclined ramps adapted to be disposed proximate the respective lower wheel or wheels of the vehicle; and
    means for nonrigidly linking the ramps to the vehicle at positions on the vehicle disposed relatively behind the base of said ramps when the ramps are located proximate the lower wheel or wheels of the vehicle so that the vehicle can be motivated to cause the lower wheel or wheels to travel up the ramps until the linking means become taut, said linking means including coded indicia corresponding to the coded indicia on the determining means to indicate the appropriate length of said linking means required to allow the vehicle to travel up the ramps until the vehicle is substantially level, the linking means then becoming taut to stop the vehicle in the level position.

8. A system as recited in claim 7 wherein each ramp comprises four rigid members hinged together at their ends to form a closed loop, said rigid members being foldable from a flat configuration for storage into a ramp configuration for use to level the vehicle.

9. A system as recited in claim 7 and additionally comprising hooks located on the vehicle at said positions on the vehicle disposed relatively behind the bases of said ramps for attachment of the linking means thereto.

10. A system as recited in claim 9 and additionally comprising secondary hooks located on the vehicle at positions spaced a preselected distance behind said other hooks relative to the base of said ramps for initial attachment of the linking means to position the ramps at appropriate locations on the terrain for subsequent leveling of the vehicle.

11. A system for leveling a vehicle parked on uneven terrain comprising:
means for determining the wheel or wheels of the vehicle on lower positions of the terrain relative to one or more other wheels on the vehicle, said determining means including coded indicia indicating the relative amount that said lower wheel or wheels should be raised to level the vehicle;
one or more inclined ramps adapted to be disposed proximate the respective lower wheel or wheels of the vehicle;
pairs of spaced attachment means located on the vehicle relatively behind said ramps disposed proximate the respective lower wheel or wheels of the vehicle; and
nonrigid linking means for connecting the ramps to the attachment means furthest behind said ramps when the ramps are located proximate the lower wheel or wheels of the vehicles, said linking means including coded indicia corresponding to the coded indicia on the determining means to indicate the appropriate length of said linking means required to allow the vehicle to travel up the ramps until the vehicle is substantially level, said ramps being moved toward the respective wheels until the linking means are taut to position the ramp proximate said wheels, said linking means then being reattached to the attachment means closer to the respective wheels and the vehicle moved on to the ramps until the linking means again become taut to stop the vehicle in the level position.

* * * * *